(12) United States Patent
Bessey et al.

(10) Patent No.: US 11,137,231 B2
(45) Date of Patent: Oct. 5, 2021

(54) SOFT ARMOR FABRICATION

(71) Applicant: Point Blank Enterprises, Inc., Pompano Beach, FL (US)

(72) Inventors: Todd Bessey, Pompano Beach, FL (US); Brian Kopan, Pompano Beach, FL (US); Harold Hastings, Pompano Beach, FL (US)

(73) Assignee: Point Blank Enterprises, Inc., Pompano Beach, FL (US)

( * ) Notice: Subject to any disclaimer, the term of this patent is extended or adjusted under 35 U.S.C. 154(b) by 145 days.

(21) Appl. No.: 16/226,253

(22) Filed: Dec. 19, 2018

(65) Prior Publication Data
US 2020/0200510 A1 Jun. 25, 2020

(51) Int. Cl.
*B32B 37/14* (2006.01)
*F41H 5/04* (2006.01)
*B32B 5/26* (2006.01)

(52) U.S. Cl.
CPC ............. *F41H 5/0478* (2013.01); *B32B 5/26* (2013.01); *B32B 2571/02* (2013.01)

(58) Field of Classification Search
CPC ...................................................... B32B 37/14
See application file for complete search history.

(56) References Cited

U.S. PATENT DOCUMENTS

| | | | | |
|---|---|---|---|---|
| 3,133,289 A | * | 5/1964 | Lipschutz | A42B 1/08 2/195.6 |
| 3,333,280 A | * | 8/1967 | Hynek | A41B 3/10 2/143 |
| 3,852,825 A | * | 12/1974 | Tirsch | A41D 25/06 2/146 |
| 4,549,316 A | * | 10/1985 | Johnson | A42B 1/201 2/195.1 |
| 4,571,745 A | * | 2/1986 | Albert | A41D 27/24 2/139 |
| 5,236,121 A | * | 8/1993 | Wollman | B65D 27/00 229/68.1 |
| 5,463,929 A | | 11/1995 | Mejia | |
| 5,729,830 A | * | 3/1998 | Luhtala | A42B 1/066 2/195.1 |
| 5,941,186 A | | 8/1999 | Argentino | |
| 6,227,257 B1 | | 5/2001 | Griffiths | |

(Continued)

FOREIGN PATENT DOCUMENTS

| | | |
|---|---|---|
| CN | 100496969 C | 6/2009 |
| EP | 1025415 A1 | 8/2000 |
| WO | 2004074761 A1 | 9/2004 |

*Primary Examiner* — Andrew T Piziali
(74) *Attorney, Agent, or Firm* — Honigman LLP

(57) ABSTRACT

A soft armor panel includes a first layer having a first outward facing surface and an opposite first inward facing surface. The soft armor panel also includes a second layer disposed adjacent to the first inward facing surface of the first layer, the second layer having a proximate end and a distal end. The soft armor panel further includes a third layer disposed adjacent to the second layer opposite the first layer. The third layer has a second outward facing surface and an opposite second inward facing surface, the second inward facing surface facing the second layer. The third layer includes a folded portion extending around at least one of the proximate end or the distal end of the second layer and tucking in between the first layer and the second layer.

4 Claims, 8 Drawing Sheets

(56) References Cited

U.S. PATENT DOCUMENTS

| | | |
|---|---|---|
| 6,737,368 B2 | 5/2004 | Chiou |
| 6,846,758 B2 | 1/2005 | Bhatnagar et al. |
| 6,899,009 B2 | 5/2005 | Christiansen et al. |
| 7,930,966 B1 | 4/2011 | Bhatnagar et al. |
| 8,245,319 B2 | 8/2012 | Neal |
| 8,956,985 B2 | 2/2015 | Lampo et al. |
| 9,068,802 B2 | 6/2015 | Citterio et al. |
| 2013/0149103 A1* | 6/2013 | Stevenson ............ F41H 5/0478 415/9 |
| 2015/0247707 A1 | 9/2015 | Rossow et al. |
| 2015/0343738 A1 | 12/2015 | Strauss |

\* cited by examiner

SOFT ARMOR FABRICATION

TECHNICAL FIELD

This disclosure relates to soft armor fabrication.

BACKGROUND

Armor (e.g., body armor) is equipment commonly used by military and enforcement personnel. Armor is often equipped as a form of protection from penetrative wounds, such as ballistic wounds and/or stab wounds. For example, armor may prevent or reduce trauma (e.g., ballistic trauma or stab wound trauma) that can damage vital organs. Two types of armor are hard armor and soft armor. Hard armor typically refers to rigid material (e.g., rigid plates) while soft armor refers to a flexible material. As a flexible material, soft armor may not be as strong as hard armor, but the flexible material may be more effective than a rigid material for motion or heat dissipation. For example, personnel may not be able to wear hard armor to cover parts of the body that require flexure. In this situation, soft armor may provide protection yet still enable an adequate degree of motion. Due to its flexibility, soft armor may be used alone or in combination with hard armor to cover parts of the body that require flexure. Moreover, soft armor may take advantage of new material technology to offer flexible protection solutions along with additional stopping power in previously vulnerable positions of the body. Soft armor may also provide a cost effective protection solution in scenarios where the strength and the rigidity of hard armor is expensive.

SUMMARY

One aspect of the disclosure provides a soft armor panel. The soft armor panel includes a first layer having a first outward facing surface and an opposite first inward facing surface. The soft armor panel further includes a second layer disposed adjacent to the first inward facing surface of the first layer. Here, the second layer has a proximate end and a distal end. The soft armor panel also includes a third layer disposed adjacent to the second layer opposite the first layer. The third layer has a second outward facing surface and an opposite second inward facing surface. The second inward facing surface faces the second layer. The third layer also includes a folded portion extending around at least one of the proximate end or the distal end of the second layer and tucking in between the first layer and the second layer.

Implementations of the disclosure may include one or more of the following optional features. In some implementations, the folded portion extends around each of the proximate end and the distal end of the second layer. At least one of the first layer, the second layer, or the third layer may include laminated plies or ballistic resilient material. Additionally or alternatively, each of the first layer, the second layer, or the third layer may include ballistic resilient material.

In some examples, the soft armor panel includes stitching securing each of the first layer, the second layer, and the third layer together. The stitching extends from the outward facing surface of the first layer to an outward facing surface of the third layer through the folded portion of the third layer. The stitching may be offset from the at least one of the proximate end or distal end of the second layer. Optionally, the stitching may be offset from at least one of the proximate end or distal end of the second layer by about one inch. The stitching may form a bartack pattern. When the stitching forms a bartack pattern, the bartack pattern may alternate across a width of the panel. For instance, the width of the panel extends perpendicular to an axis from the proximate end to the distal end.

Another aspect of the disclosure provides a soft armor panel. The soft armor panel includes a ballistic resilient first layer having a first surface and an opposite second surface and comprising a folded portion. The soft armor panel also includes a ballistic resilient second layer disposed adjacent to the first surface of the ballistic resilient first layer, the ballistic resilient second layer having a proximate end and a distal end. The folded portion extends around at least one of the proximate end or the distal end of the ballistic resilient second layer. The soft armor panel further includes stitching securing the ballistic resilient first layer to the ballistic resilient second layer, the stitching extending from the folded portion through the ballistic resilient second layer to the second surface of the ballistic resilient first layer.

Implementations of this aspect of the disclosure may include one of more of the following optional features. In some configurations, the stitching is offset from the at least one of the proximate end or distal end of the ballistic resilient second layer. The stitching may be offset from at least one of the proximate end or distal end of the ballistic resilient second layer by about one inch. The stitching may also form a bartack pattern.

In some examples, the stitching includes a first row of stitching and a second row of stitching offset from the first row of stitching. Here, the first row of stitching and the second row of stitching may alternate in misalignment across a width of the panel, the width of the panel extending perpendicular to an axis from the proximate end to the distal end.

Another aspect of the disclosure provides a method of forming a soft armor panel. The method includes obtaining a ballistic resilient first layer, a ballistic resilient second layer, and a ballistic resilient third layer. The method also includes arranging the ballistic resilient first layer, the ballistic resilient second layer, and the ballistic resilient third layer in a stack. The stack includes the ballistic resilient second layer on top of the ballistic resilient third layer and the ballistic resilient first layer on top of the ballistic resilient second layer. The method further includes folding a portion of the ballistic resilient third layer around at least one of a proximate or a distal end of the ballistic resilient second layer and tucking the folded portion of the ballistic resilient third layer in between the ballistic resilient first layer and the ballistic resilient second layer. The method also includes stitching each of the ballistic resilient first layer, the ballistic resilient second layer, and the ballistic resilient third layer together to form a panel by stitching from an outward facing surface of first layer to the outward facing surface of the ballistic resilient third layer through the folded portion of the ballistic resilient third layer.

Implementations of this aspect of the disclosure may include one of more of the following optional features. In some implementations, the stitching includes stitching at a location offset from the at least one of the proximate or distal end of the ballistic resilient second layer. Additionally or alternatively, the stitching may include stitching at a location offset from the at least one of the proximate or distal end of the ballistic resilient second layer by about one inch.

In some examples, the stitching forms a bartack pattern. The bartack pattern may include a first row of stitching and a second row of stitching offset from the first row of stitching. The first row of stitching and the second row of stitching may alternate in misalignment across a width of the panel and the width of the panel may extend perpendicular to an axis from the proximate end to the distal end.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A ballistic environment 10 generally refers to an environment that includes a soft armor panel 100. The soft armor panel 100 is a panel that may be incorporated into various articles of clothing to function as soft armor. Some examples of these articles of clothing include vests, suspenders, belts (e.g., a cummerbund), sleeves, shoulder pads, shorts, pants, jackets, backpacks, helmets, etc. The soft armor panel 100 is ballistic resilient such that the panel 100 is capable of impeding (e.g., reducing) ballistic penetration (e.g., from projectiles, such as bullets and shrapnel, or other penetrating objects). To be ballistic resilient, some or all portions of the panel 100 may be formed from a ballistic resilient material. The soft armor panel 100 may be an insert into an article of clothing or integrated into a material construction of the article of clothing (or a portion of the article of clothing). For example, the soft armor panel 100 may be used to form part of or an entirety of the material used to create the article of clothing.

Figure 1A:
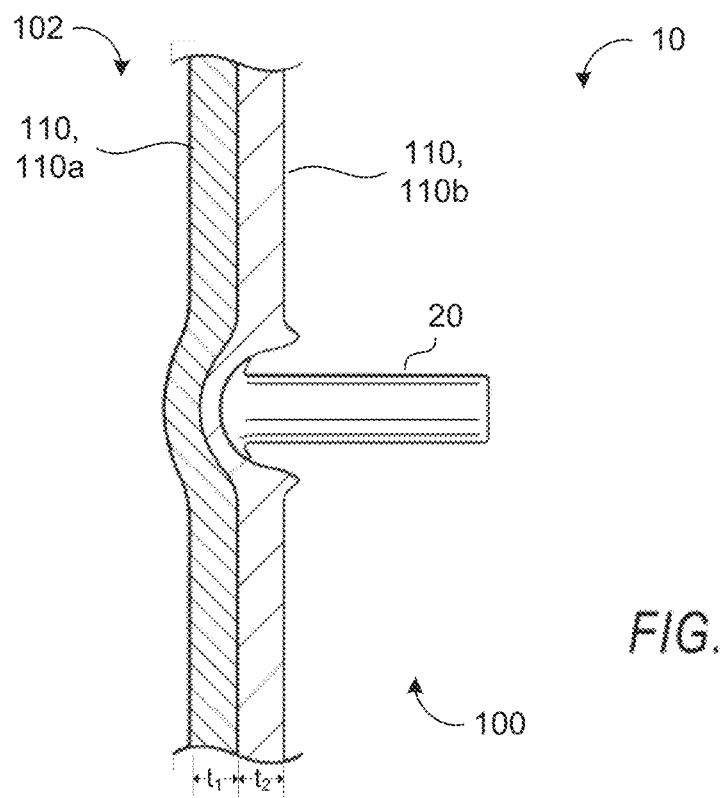
FIGS. 1A and 1B are side views of example ballistic environments with soft armor.

FIG. 1A is shown as an example to illustrate shortcomings of previous soft armor panel designs. In previous soft armor panel designs, such as FIG. 1A, when the panel 100 received an impact from a projectile 20 near an edge 102 of the panel 100, generally, the projectile 20 displaced the panel 100 similar to a ricochet. In other words, an edge construction of these panels 100 may receive reduced protection in an area near the edge 102 of the panel 100. With reduced protection, a wearer of the panel 100 may be more vulnerable to suffer an injury (e.g., a severe or fatal injury) from a projectile 20 that strikes the wearer in this area. For example, a projectile 20 that ricochets when impacting near the edge 102 of the panel 100 may redirect into an area of the wearer unprotected by the panel 100 adjacent to the edge 102 of the panel 100 and cause serious harm.

Figure 1B:
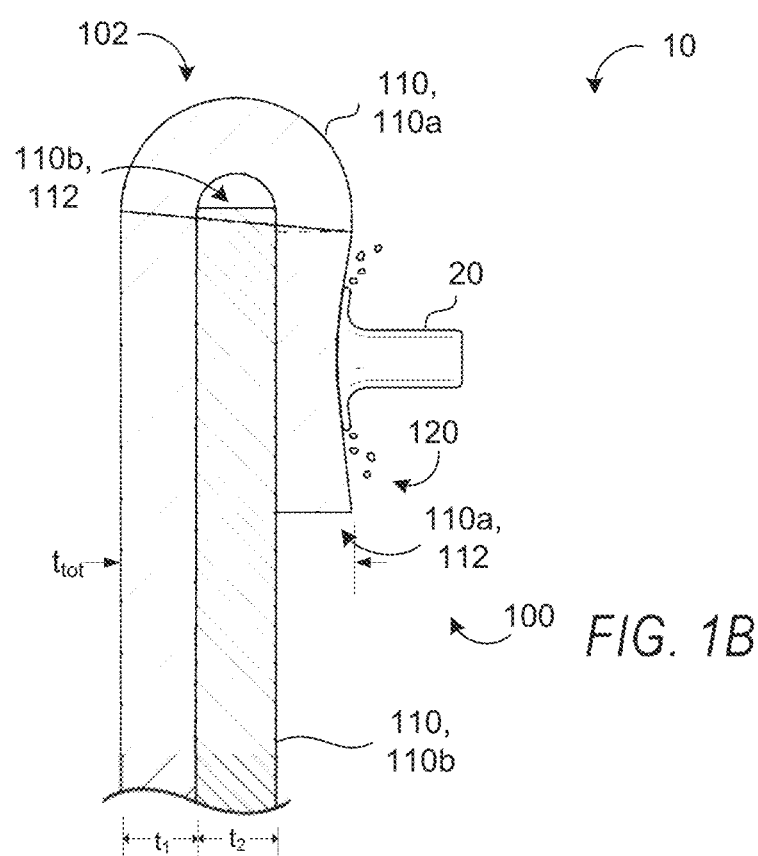

FIG. 1B is an example of a soft armor panel 100 that includes edge reinforcement. In this example, when the projectile 20 (e.g., shown as a bullet) strikes the soft armor panel 100 near the edge 102, the soft armor panel 100 provides increased stopping power for the projectile 20. This increased stopping power may prevent the projectile 20 from ricocheting into the wearer or causing harm by further penetrating the soft armor panel 100.

As shown in FIGS. 1A and 1B, the soft armor panel 100 includes a first layer 110, 110a and a second layer 110, 110b. Here, to provide edge reinforcement, the first layer 110a is folded over the second layer 110b. The fold is such that the first layer 110a includes enough material for an end 112 of the first layer 110a to wrap around an end 112 of the second layer 110b. By wrapping around the second layer 110b, the first layer 110a forms a reinforced edge 120.

Referring to a two layer design, FIG. 1A depicts an edge 102 where the panel 100 has a thickness corresponding to a combination of a thickness $t_1$ of the first layer 110a and a thickness $t_2$ of the second layer 110b. In contrast, FIG. 1B depicts the panel 100 at the reinforced edge 120 with a total thickness $t_{tot}$ represented by the equation $t_{tot}=2t_1+t_2$. In other words, the panel 100 with the reinforced edge 120 provides an increased thickness equal to the thickness $t_1$ of the end 112 of the first layer 110a that folds around the second layer 110b (e.g., shown here as increasing the thickness of the panel 100 by about 50%). This reinforced edge 120 may provide increased stopping power (e.g., due to its increased thickness) without requiring an entire additional third layer.

In some examples, each layer of the soft armor panel 100 may be a different type of material. In other examples, each layer of the soft armor panel 100 is a similar material. Additionally or alternatively, depending on the type of material selected for a given layer of the soft armor panel 100, the material may be different thicknesses to accommodate for desired protection properties and/or the type of article of clothing the soft armor panel 100 is being incorporated into.

In some implementations, each layer is constructed from one or more sublayer (i.e., plies). These plies may combined together, for example, by lamination, weaving, fusing, etc., to form each layer. The thickness t of each layer 110 may depend on the number of plies forming the layer 110. As an example, the first layer 110a is formed from four plies while the second layer 110b is formed from twenty plies. To impede ballistic penetration, the plies and/or layers 110 may be formed from various combinations of flexible material including various woven, non-woven, synthetic, and/or natural fibers. These fibers may form the plies that collectively define a layer 110 (e.g., the first layer 110a or the second layer 110b) of the soft armor panel 100. In some implementations, the flexible material includes a polymeric substance (e.g., a rubber or other elastomer). The use of multiple layers 110 to form the soft armor panel 100 may increase strength, reduce fraying, or in certain circumstances contribute stiffness to the flexible material. In some configurations, these layers/sublayers are formed from aramid fibers, such as Nomex®, Kevlar®, Twaron®, Technora®, ultra-high-molecular-weight polyethylene (e.g., Dyneema®), Nylon, Cordura®, etc.

Figure 2A:
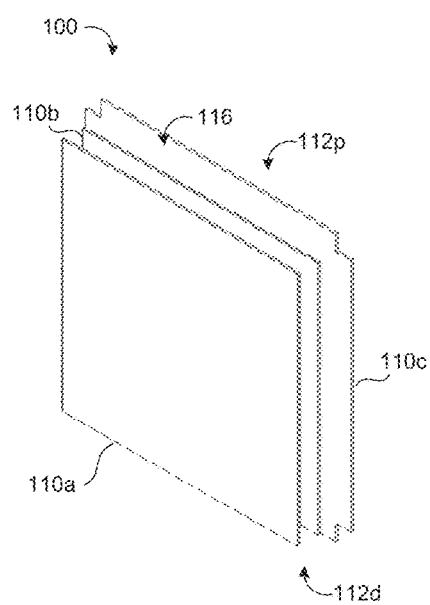
FIG. 2A is a perspective view of an example soft armor panel configuration.
Figure 2B:
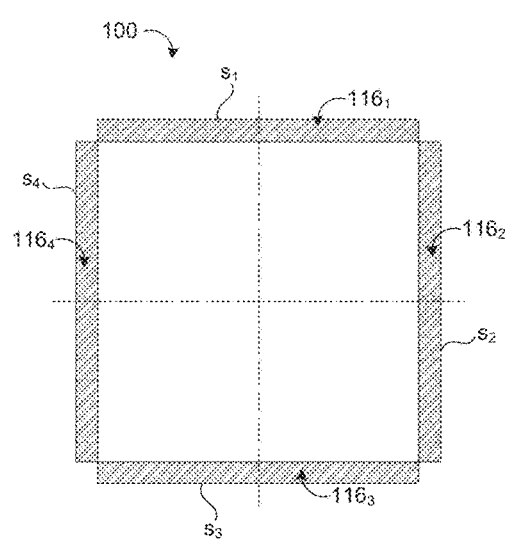
FIG. 2B is a front view of an example soft armor panel configuration.
Figure 2C:
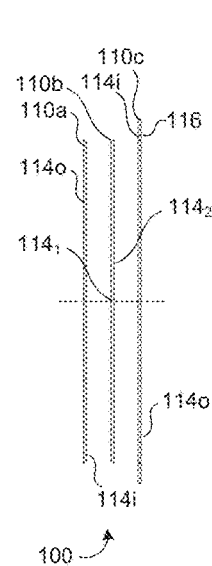
FIG. 2C is a side view of an example soft armor panel configuration.

FIGS. 2A-2C are examples of a configuration for the soft armor panel 100. Here, the soft armor panel 100 includes three layers 110, 110a-c. In these examples, the first layer 110a and the third layer 110c are outer layers of the soft armor panel 100. As outer layers of the soft armor panel 100, one of the first layer 110a or the third layer 110c may face a body wearing an article of clothing integrating the soft armor panel 100 while the other of the first layer 110a or the third layer 110c faces outward from the body and may receive an initial impact from a projectile 20. As outer layers, each of the first layer 110a and the third layer 110c has an outward facing surface 114o and an inward facing surface 114i. For the three layer construction, the second layer 110b is arranged between the first layer 110a and the third layer 110c. The second layer 110b includes a first surface $114_1$ that faces the first layer 110a and a second surface $114_2$ that faces the third layer 110c. Each layer 110 includes a proximate end 112p and a distal end 112d. FIGS. 2A and 2C illustrate that first layer 110a is disposed adjacent to the second layer 110b such that the inward facing surface 114i of the first layer 110a opposes (or faces) the first surface $114_1$ of the second layer 110b. Similarly, the third layer 110c is disposed adjacent to the second layer 110b such that the inward surface 114i of the third layer 110c opposes (or faces) the second surface $114_2$ of the second layer 110b. In some examples, the combination of layers 110 for a panel 100 is referred to as a stack and includes a defined order to form the reinforcement edge 120.

With continued reference to FIGS. 2A-2C, the third layer 110c includes additional material to form a fold region 116 (also referred to as a fold portion). FIG. 2B illustrates that each side s (e.g., sides $s_{1-4}$) of the third layer 110c includes a fold region 116 (e.g., fold regions $116_{1-4}$). Although FIGS. 2A-2C depict a fold region $116_{1-4}$ on each side $s_{1-4}$ of the third layer 110c, the fold region 116 may alternatively be included on any of one or more sides "s" of the third layer 110c. In some configurations, the additional material forming the fold region 116 is shaped such that when the additional material is folded, the folded region 116 from a first side s overlaps the folded region 116 of an adjacent side s (e.g., the first side Si overlaps with the second side $s_2$). For instance, FIG. 2B depicts rectangular cutouts of the additional material at adjacent sides that would overlap when folded. In other configurations, the additional material forming the fold region 116 is shaped (e.g., in an angled edge) such that when the additional material is folded, the folded region 116 from the first side $s_1$ does not overlap the folded region 116 of an adjacent side s (e.g., the first side Si does not overlap with the second side $s_2$).

Figures 3A, 3B:
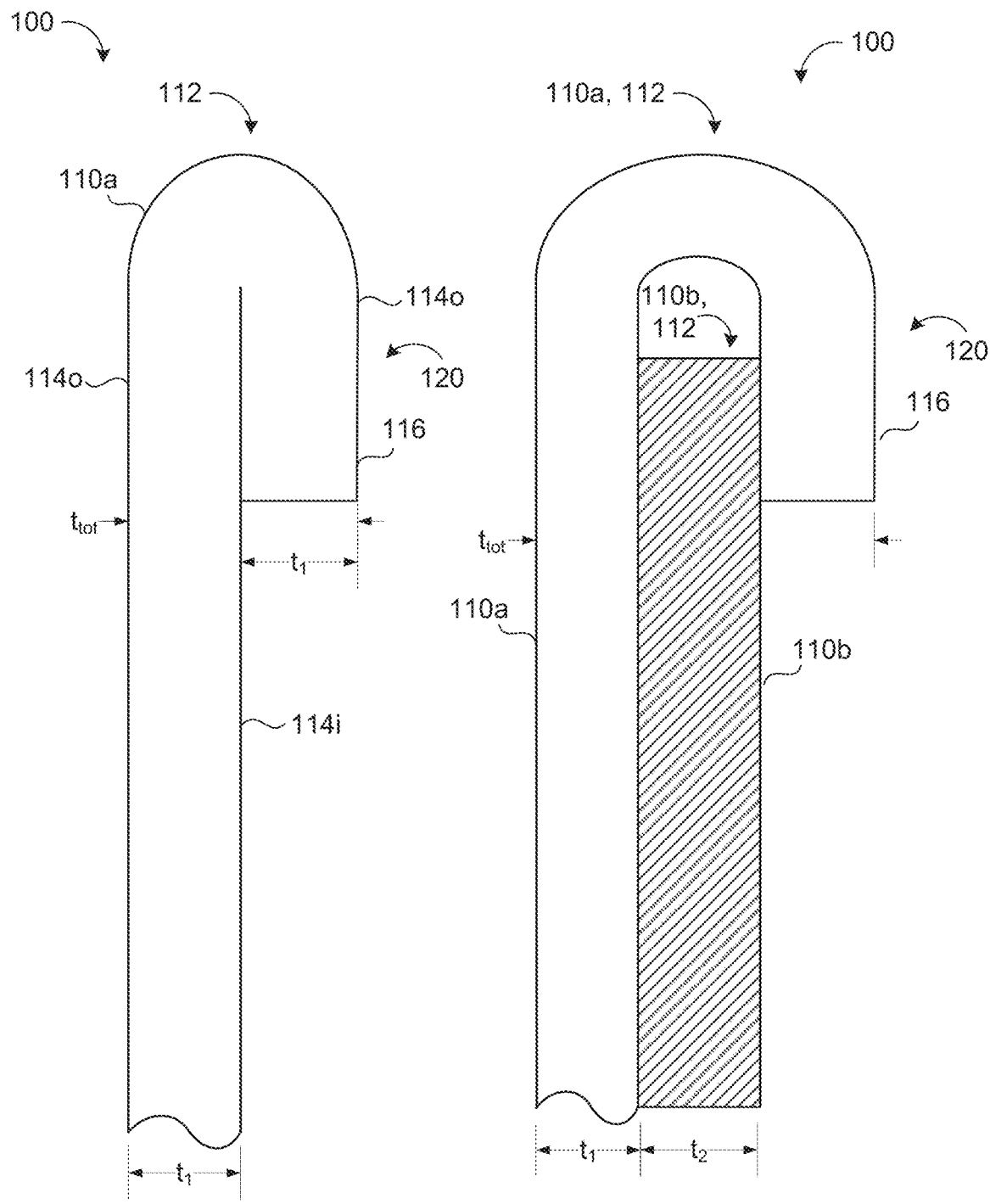
FIGS. 3A and 3B are side views of example soft armor panel reinforced edge configurations.

During construction of the panel 100, the fold region 116 may be folded in various ways. For simplicity, when the fold region 116 is folded, it forms a folded portion with a reinforced edge 120. FIG. 3A depicts an example where the folded region 116 of a layer 110 is folded on the layer 110 itself. Here, once folded, the reinforced edge 120 allows the layer 110 at an end 112 (e.g., a proximate end 112p and/or a distal end 112d) to double its thickness t by its own thickness (e.g., $t_{tot}=2t$). For instance, when the third layer 110c of FIG. 2C is folded on itself, it results in double its thickness t at the reinforced edge 120 with a previous portion of the outer surface 114o from the fold region 116 now part of the inward surface 114i facing an adjacent layer 110 (e.g., the second layer 110b).

In other configurations, the layer 110 with the fold region 116 folds over an end 112 of one or more adjacent layer(s) 110. For example, FIG. 3B illustrates a first layer 110a folding over a second layer 110b to result in a reinforced edge 120 with a total thickness $t_{tot}$ corresponding to twice the thickness $t_1$ of the first layer 110 with the fold region 116 in addition to the thickness $t_2$ of the second layer 110 with the end 112 enveloped (i.e. surrounded by) by the fold region 116. With a multi-layer construction, the reinforced edge 120 may have a total thickness $t_{tot}$ equal to twice the thickness t of the layer 110 with the fold region 116 and the thickness t of each layer enveloped by the fold region 116. In some configurations, the fold region 116 has a different thickness t than the non-fold region of the layer 110 (e.g., includes less plies and has less thickness t or more plies and has a greater thickness t) such that the total thickness $t_{tot}$ does not equal exactly twice the thickness t of the layer 110 with the fold region 116 and the thickness t of each layer enveloped by the fold region 116. In some examples, the reinforced edge 120 forms part of the outer surface 114o of the soft armor panel 100 (e.g., FIG. 3A). In other examples (FIG. 4B), the fold region 116 is folded over a select number of adjacent layer(s) 110 and tucked into the layers 110 at a particular position of the soft armor panel 100 such that the reinforced edge 120 is not externally showing on the soft armor panel 100.

Additionally or alternatively, each side s including a fold region 116 may be folded in different ways than another side s of the layer 110 including a corresponding fold region 116. For instance, a soft armor panel 100 includes a layer 110 with a fold region 116 at a first side $s_1$ that is folded on itself while a second fold region 116 at a second side $s_2$ of the same layer 110 folds over any combination of one or more layers 110. This hybrid folding technique may allow the soft armor panel 100 to have different reinforcement edge thicknesses in different regions of the same soft armor panel 100. In other words, an article of clothing incorporating the soft armor panel 100 may provide differing degrees of protection and/or flexibility in different areas of the article.

Figure 4A:
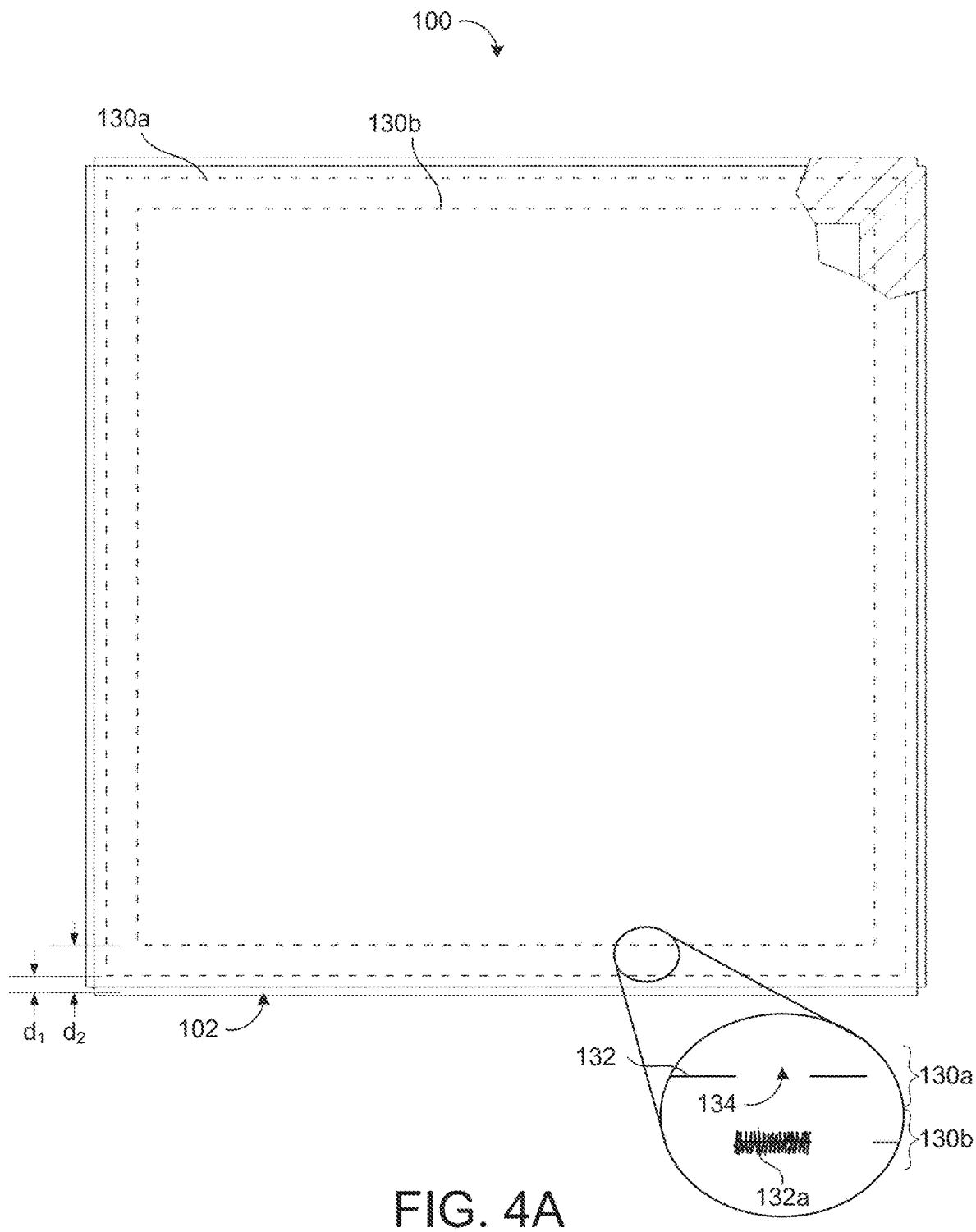
FIG. 4A is a front view of an example soft armor panel configuration with a securement pattern.
Figure 4B:
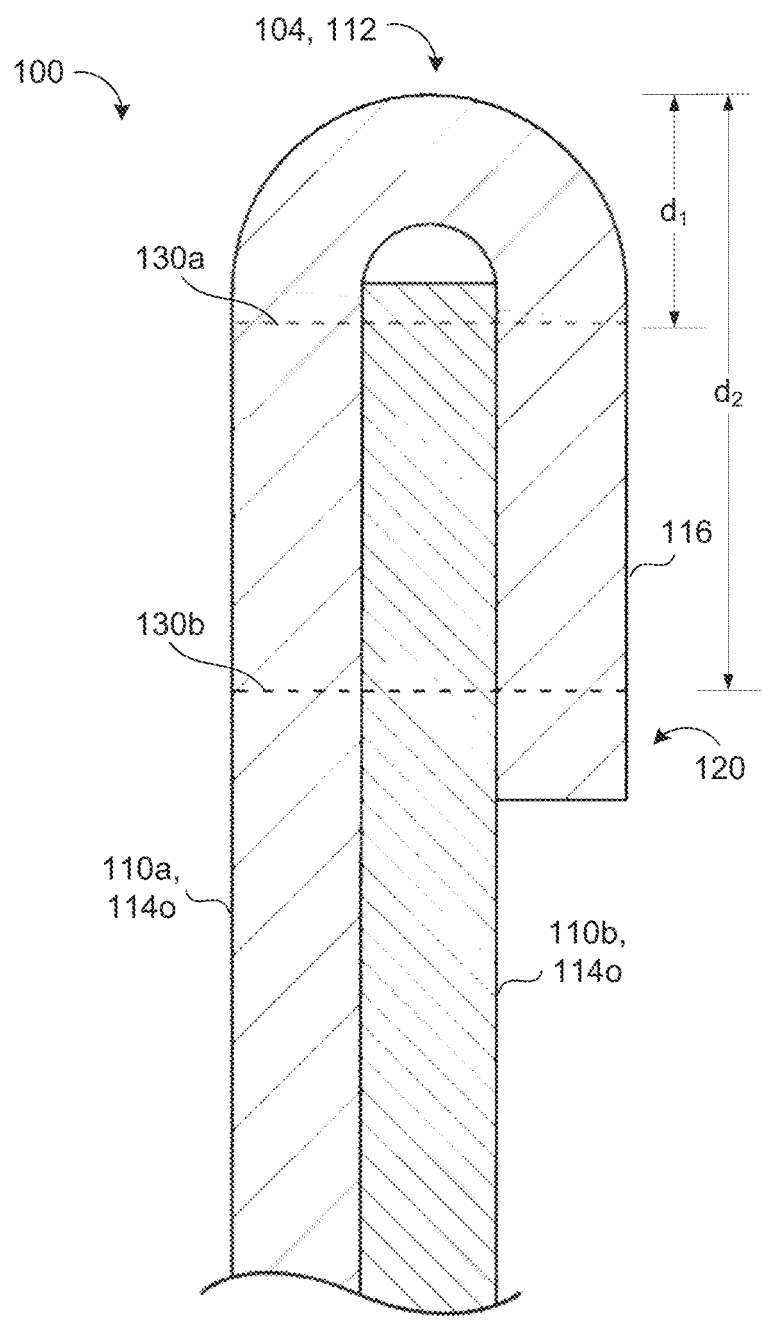
FIG. 4B is a side view of an example soft armor panel configurations with a securement pattern.

FIGS. 4A and 4B are examples of a securement means 130 for the soft armor panel 100. The securement means 130 attaches one or more layers 110 together as well as may additionally secure the reinforcement edge 120 in a folded position. Some examples of securement means 130 include stitching, sewing, adhesion (e.g., by glue or other adhesive), welding (e.g., sonic welding, heat staking, or other methods of fusing materials), etc. In some implementations, one or a combination of securement means 130 may be used when forming the soft armor panel 100. To illustrate, stitches may secure all layers 110 together while adhesive may secure the folded portion in the folded position.

FIGS. 4A and 4B are examples of stitching as the securement means 130 as shown by the dotted lines. The stitching may correspond to a stitching pattern including, for example, one or more rows of stitching. For instance, FIGS. 4A and 4B depict the stitching as two rows (e.g., a first row 130a and a second row 130b) of stitching offset from each other around a perimeter of the soft armor panel 100. In some examples, the stitching is offset from an edge 102 (where the panel material terminates at, for example, the proximal end 112p or the distal end 112d) of the soft armor panel 100 a distance d. For example, the first row 130a is offset from the edge 102 a first distance $d_1$ while the second row 130b is offset from the edge a second distance $d_2$. In some configurations, the first distance $d_1$ is less than half an inch from the edge 102 of the panel 100 (e.g., ¼" from the edge 102 of the soft armor panel 100) while the second distance $d_2$ is less than one inch from the edge 102 (e.g., ¾" from the edge 102 of the soft armor panel 100).

In some examples, the stitching pattern corresponds to a continuous stitch line (e.g., a stitch run). In other examples, the stitching pattern is a discontinuous stitch line having alternating stitching segments 132 and unstitched segments 134. The stitching pattern may span a width or substantially the width of the panel 100. In some configurations, the stitching segments 132 correspond to a tack pattern, such as a bar tack 132a (e.g., shown in the enlarged view in FIG. 4A) or a lockstitch pattern (e.g., a 301 lockstitch). In other words, the stitching segment 132 corresponds to short stitches such as whip stitches or zigzag stitches that are stitched in a direction perpendicular to a length of the segment 132. In configurations where the stitching includes more than one row, stitching segments 132 may be misaligned between adjacent rows to help reinforce the stitched region of the panel 100. In other words, a stitching segment 132 of the first row 130a is not aligned with a stitching segment 132 of the second row 130b (e.g., shown by a lack of vertical alignment between stitching segments 132 in FIG. 4A).

FIG. 4B is an example of the soft armor panel 100 from a side view. This view is an example of the securement means 130 to illustrate how the securement means 130 may secure the layers 110 of the soft armor panel 100. Here, stitching 130 as the securement means extends from the first layer 110a through the second layer 110b and through the reinforced edge 120 in the fold region 116 of the first layer 110a. To correspond to FIG. 4A, the stitching 130 includes two rows 130a, 130b at distances $d_1$, $d_2$ from an end 112 of the layers 110 (or edge 102 of the panel 100). In this example, the reinforced edge 120 is secured to each layer 110 at two locations (e.g., the first row 130a and the second row 130b) in the fold region 116. In other words, this securement means 130 maintains the folded portion in the folded position during use of the soft armor panel 100. Although, FIG. 4B depicts two layers 110a, 110b with two locations for the securement means 130, the securement means 130 may secure the fold region in the folded position with any number of securement means locations for any number of layer(s) 110; thus, the securement means 130 is scalable for a panel 100 with any number of layer(s) 110.

Figure 5A:
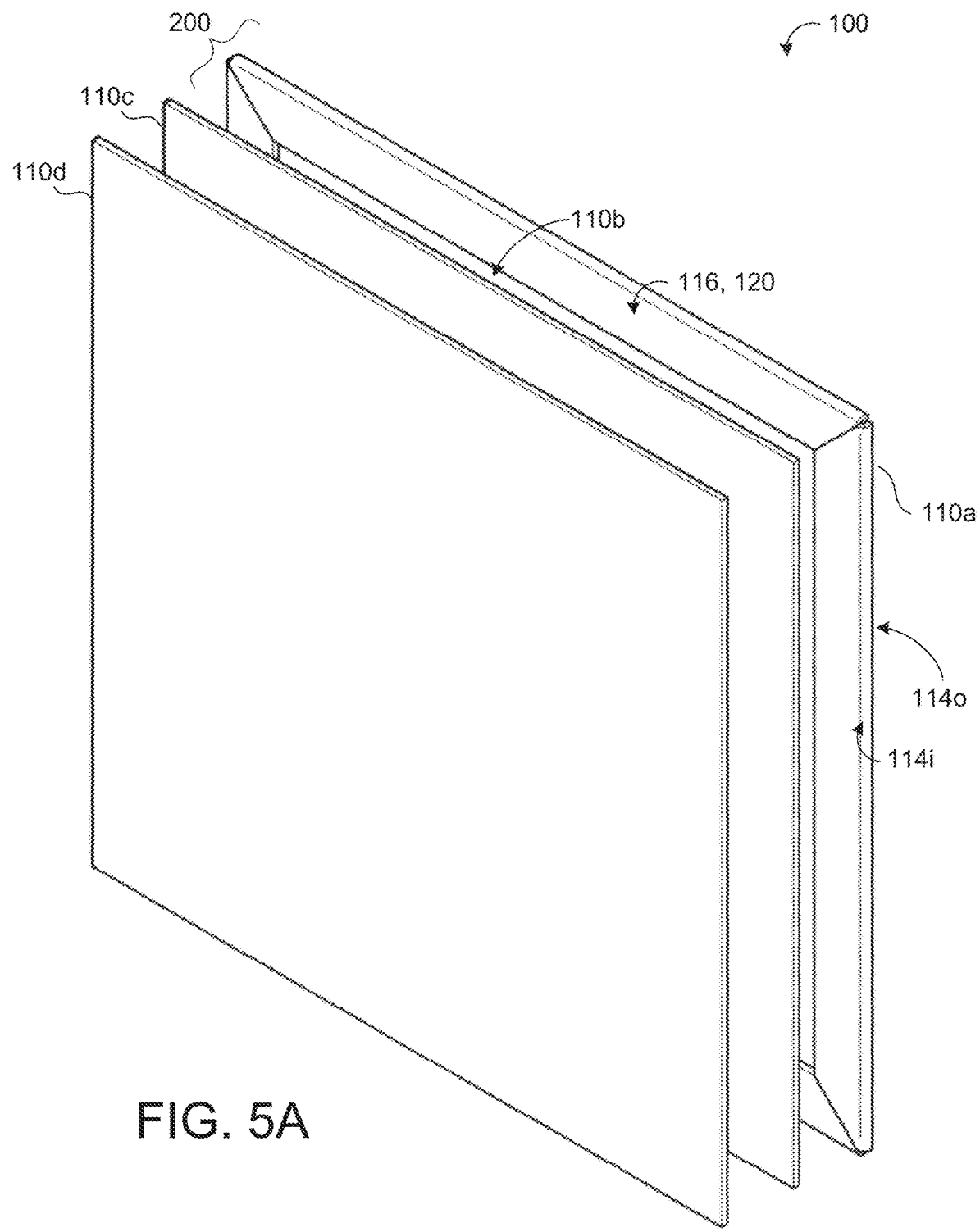
FIG. 5A is a perspective view of an example soft armor panel configuration.
Figure 5B:
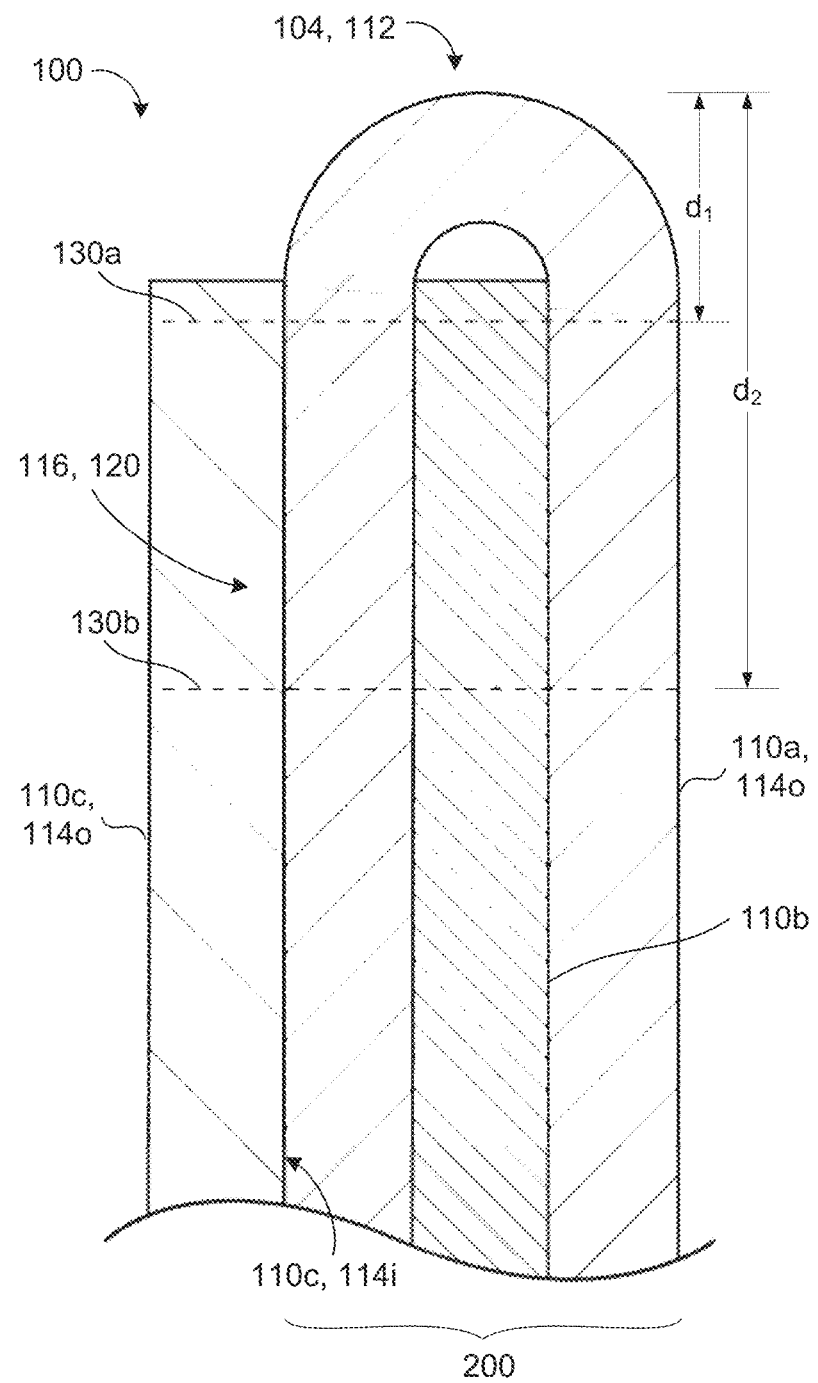
FIG. 5B is a side view of an example soft armor panel configurations with a securement pattern.

FIGS. 5A and 5B illustrate that the soft armor panel 100 may include the fold region 116 forming the reinforced edge 120 tucked between layers 110. FIG. 5A depicts four layers 110a-d. For this four layer construction, a first layer 110a includes a fold region 116 that is wrapped around a second layer 110b (e.g., surrounding an end 112 of the second layer 110b) forming a sub-assembly 200 with a reinforced edge 120. The sub-assembly 200 may then be nested within the soft armor panel 100 by attaching to one or more layers 110, such as a third layer 110c and a fourth layer 110d. Although not shown, a securement means 130 may secure the sub-assembly 200 to the one or more layers 110. In some examples, the sub-assembly 200 is formed from an outer layer of the panel 100. For example, the sub-assembly 200 of FIG. 5A has an outer surface 114o and an inward surface 114i facing the third layer 110c. Yet in other examples, the sub-assembly 200 is formed from internal layers 110 and secured to outer layers to construct the panel 100.

In some implementations, such as FIG. 5B, three layers 110a-c form the panel 100 with the fold region 116 tucked between adjacent layers 110. Here, a first layer 110a folds over a second layer 110b to form the reinforced edge 120. As shown by FIG. 5B, the combination of the first layer 110a and the second layer 110b generate a sub-assembly 200. The sub-assembly 200, much like FIG. 5A, secures to a third layer 110c by a first and a second securement means 130a, 130b shown as stitching. For example, a surface of the fold region 116 is secured to an inward surface 114i of the third layer 110c such that the fold region 116 is disposed between the second layer 110b and the third layer 110c.

Figure 6:
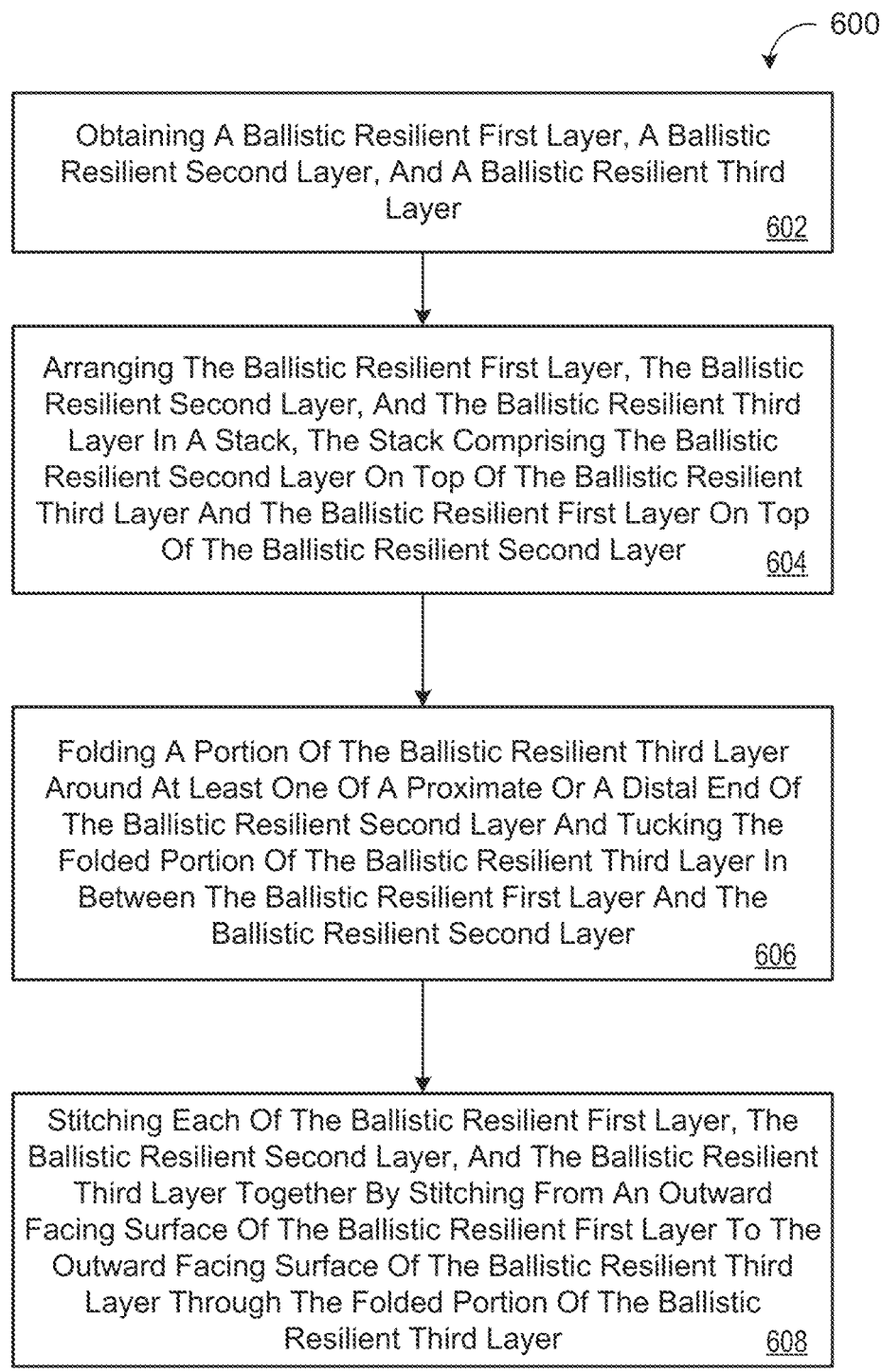
FIG. 6 is a flow diagram of an example method of forming soft armor panel.

FIG. 6 is an example method 600 for forming the soft armor panel 100. At operation 602, the method 600 obtains a ballistic resilient first layer 110a, a ballistic resilient second layer 110b, and a ballistic resilient third layer 110c. At operation 604, the method 600 arranges the ballistic resilient first layer 110a, the ballistic resilient second layer 110b, and the ballistic resilient third layer 110c in a stack. The stack includes the ballistic resilient second layer 110b on top of the ballistic resilient third layer 110c and the ballistic resilient first layer 110a on top of the ballistic resilient second layer 110b. At operation 606, the method 600 folds a portion of the ballistic resilient third layer 110c around at least one of a proximate or a distal end 112p, 112d of the ballistic resilient second layer 110b and tucks the folded portion of the ballistic resilient third layer 110c in between the ballistic resilient first layer 110a and the ballistic resilient second layer 110b. At operation 608, the method 600 stitches each of the ballistic resilient first layer 110a, the ballistic resilient second layer 110b, and the ballistic resilient third layer 110c together by stitching from an outward facing surface 114o of the ballistic resilient first layer 110a to the outward facing surface 114o of the ballistic resilient third layer 110c through the folded portion of the ballistic resilient third layer 110c.

A number of implementations have been described. Nevertheless, it will be understood that various modifications may be made without departing from the spirit and scope of the disclosure. Accordingly, other implementations are within the scope of the following claims.

What is claimed is:

1. A method of forming a soft armor panel, the method comprising:
   obtaining a ballistic resilient first layer, a ballistic resilient second layer, and a ballistic resilient third layer;
   arranging the ballistic resilient first layer, the ballistic resilient second layer, and the ballistic resilient third layer in a stack, the stack comprising the ballistic resilient second layer on top of the ballistic resilient third layer and the ballistic resilient first layer on top of the ballistic resilient second layer;
   folding a portion of the ballistic resilient third layer around an end of the ballistic resilient second layer and tucking the folded portion of the ballistic resilient third layer in between the ballistic resilient first layer and the ballistic resilient second layer such that an inward-facing surface of the ballistic resilient first layer engages the outward-facing surface of the ballistic resilient third layer; and
   stitching each of the ballistic resilient first layer, the ballistic resilient second layer, and the ballistic resilient third layer together by stitching from an outward-facing surface of the ballistic resilient first layer to the outward-facing surface of the ballistic resilient third layer through the folded portion of the ballistic resilient third layer.

2. The method of claim 1, wherein stitching is disposed at a location offset from the end of the ballistic resilient second layer.

3. The method of claim 1, wherein the stitching is disposed at a location offset from the end of the ballistic resilient second layer by about one inch.

4. The method of claim 1, wherein stitching forms a tack pattern, the tack pattern comprising a first row of stitching and a second row of stitching offset from the first row of stitching, the first row of stitching and the second row of stitching alternating in misalignment across a width of the panel, the width of the panel extending perpendicular to an axis from a proximate end of the panel to a distal end of the panel.

* * * * *